(12) United States Patent
Wertheim

(10) Patent No.: US 6,897,413 B1
(45) Date of Patent: May 24, 2005

(54) DEVICE FOR HEATING DYES TO TINT OPTICAL LENSES AND FILTERS

(75) Inventor: Herbert A. Wertheim, Miami, FL (US)

(73) Assignee: Brain Power Incorporated, Miami, FL (US)

( * ) Notice: Subject to any disclaimer, the term of this patent is extended or adjusted under 35 U.S.C. 154(b) by 80 days.

(21) Appl. No.: 10/810,862

(22) Filed: Mar. 29, 2004

(51) Int. Cl.[7] .......................... B29C 71/02; B05C 3/04; B05C 3/09
(52) U.S. Cl. ...................... 219/430; 219/432; 219/433; 264/1.32; 8/506
(58) Field of Search ................................ 219/430, 432, 219/433; 264/1.31, 1.32, 1.36; 351/162; 8/506; 118/412

(56) References Cited

U.S. PATENT DOCUMENTS

| | | | | |
|---|---|---|---|---|
| 111,476 | A | * 1/1871 | Ronning | ................ 220/592.15 |
| 2,236,837 | A | * 4/1941 | Rimmel | ...................... 219/430 |
| 2,551,651 | A | * 5/1951 | Vandewater | ................ 392/441 |
| 3,892,945 | A | * 7/1975 | Lerner | ......................... 219/432 |
| 4,256,697 | A | * 3/1981 | Baldwin | ..................... 219/433 |
| 5,052,337 | A | 10/1991 | Talcott et al. | |
| 5,549,543 | A | * 8/1996 | Kim | ........................... 392/433 |
| 6,216,360 | B1 | 4/2001 | Wertheim | |
| 6,417,498 | B1 | * 7/2002 | Shields et al. | .............. 219/432 |

FOREIGN PATENT DOCUMENTS

JP 06175082 A * 6/1994

* cited by examiner

Primary Examiner—Joseph Pelham

(57) ABSTRACT

A device that utilizes an improved method to heat dyes to color plastic lenses and filters.

1 Claim, 3 Drawing Sheets

DEVICE FOR HEATING DYES TO TINT OPTICAL LENSES AND FILTERS

BACKGROUND—FIELD OF THE INVENTION

The invention relates to a device used by professionals within the optical and ophthalmic industry to heat dyes to a specific temperature to color plastic lenses.

Within the optical lenses manufacturing industry, it has been a widespread practice to color lenses after manufacture in accordance with the customer's preference. Numerous devices have been used for this purpose, the most common being a type that utilizes a double tank system. The first tank is heated electrically, and a heat transfer medium indirectly heats a tank of dye. The dyes used in this process are prone to crystallization and sediment formation. The double tank system helps with this tendency. Optical dyes are most effective at a narrow temperature range (200–205° F.).

BACKGROUND—DESCRIPTION OF PRIOR ART

An examination of the various kinds of equipment available to the optical/ophthalmic industry reveals that instruments of the type under discussion are available. Wertheim and Talcott discuss devices which do not employ heat transfer fluids. However, these other systems are without the unique features of the present device.

OBJECTS AND ADVANTAGES

Accordingly, several objects and advantages of the present device are:

(a) to use a configuration whereby the heat transfer fluid heats the dye containing tanks only from the sides thus avoiding burning or crystallization of dye that has settled to the bottom of the tinting tank;

(b) to further avoid the problems of dye crystallization and sediment formation, by stirring the dye tank constantly or in an alternating manner. The stirring action further helps to break up the boiling bubbles so that the boiling action is less violent, thus allowing operation at or near boiling temperatures;

(c) to use the stirring bar to distribute and conduct the heat more quickly from the outside heat transfer fluid to the container that holds the dye solution in the container. The stirring action allows for faster heat-up time and recovery time of the specified dye solution temperature when lenses or filters are inserted into the container.

(d) to include a stir bar protective cage which not only protects the stir bar from foreign objects falling down on it but also supports any lens or filter holders which may be inserted into the tinting tank. In place of a stir bar and protective cage, a rotating platform which includes a receiver magnet may be employed. This rotating device may also be driven mechanically rather than by magnetic coupling. This device will cause any lens, filter or multiple lens holder placed upon it to rotate in the dye fluid;

(e) to utilize dye containing tanks that are several inches taller than the level of the surface of the liquid dye, thus preventing boil-overs if the liquid should boil.

DRAWING FIGURES

REFERENCE NUMERALS IN DRAWINGS

Figure 1:
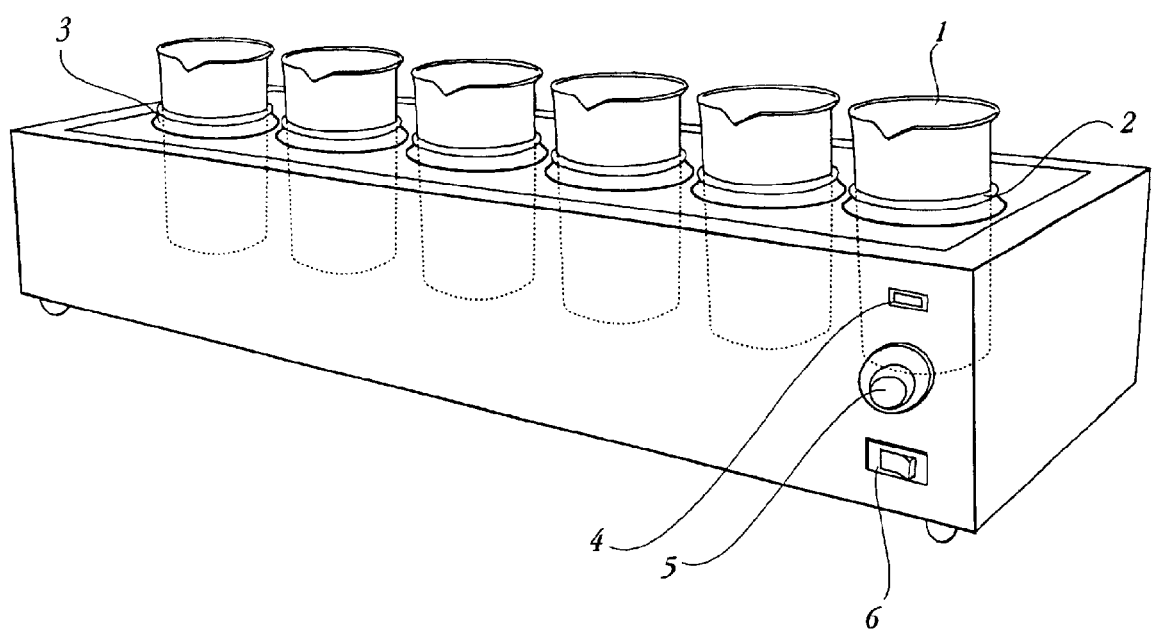
FIG. 1 shows an over view of the preferred embodiment of the device
Figure 2:
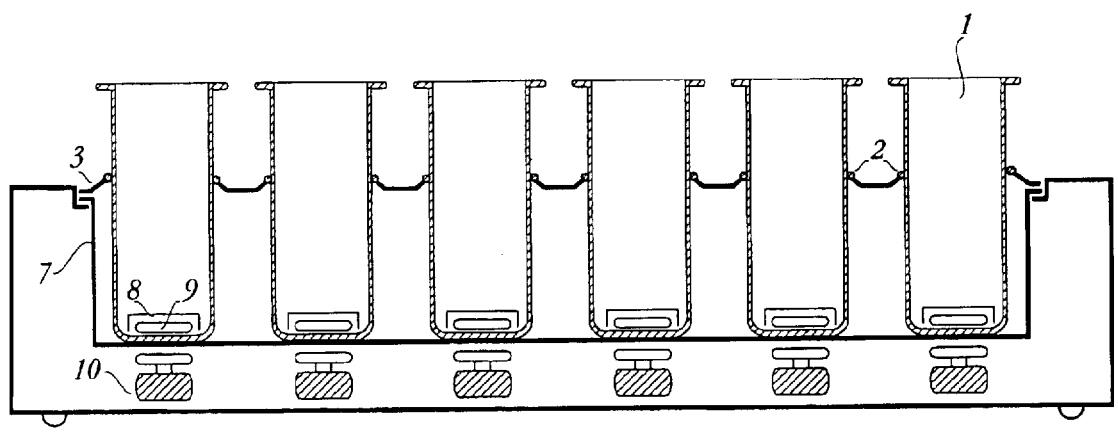
FIG. 2 shows a cross section of the device, showing significant elements
Figure 3:
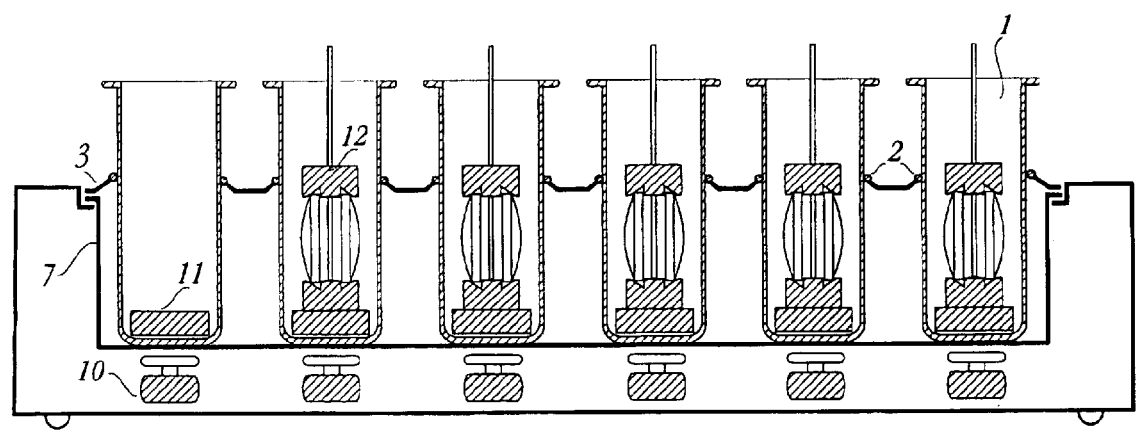
FIG. 3 shows a cross section of an alternate embodiment of the device

1. Tanks that contain dye solution
2. O-ring seal surrounding the tinting tank
3. Beveled surface of the containment reservoir which mates with the o-ring seal
4. Heating indicator light
5. Thermostatic control knob
6. Main power control switch or circuit breaker switch
7. Heat transfer fluid containment tank which is also called a liner pan
8. Stir bar protective cage
9. Magnetic stir bar
10. Spinning motor with magnetic coupler
11. Rotating platform, a magnetically or mechanically coupled rotator to support lenses and rotate them
12. Lenses placed on the rotating platform being rotated in the dye

DESCRIPTION

The device consists of three basic parts.

1. Tanks that contain the dye.
2. A heating system that heats the dyes from the side of the tanks.
3. A stirring system that keeps the dye in constant agitation.

Operation

The tanks are filled with the dye solution and the device is heated up to the correct operating temperature. The thermostat controls the heating process and maintains an accurate temperature in the heat transfer medium to within several degrees. When the device reaches the optimal temperature for the lenses and the dye, the lenses are lowered into the dye solution. Coloring of the lens typically takes place within a few seconds.

SUMMARY, RAMIFICATIONS, AND SCOPE

Accordingly, the reader will see that the device will allow an improved method of coloring optical lenses. The method of heating has been designed to heat the dyes from the side of the tank. This unique design eliminates the problems caused by the dye materials. When these materials settle to the bottom of the tank, heating from below can lead to burning and crystallization of the dyes.

In addition, the constant agitation of the dye helps prevent sediment formation that leads to burning and crystallization of the dyes. The agitation also maintains a high concentration level of the dye around the lens, which increases the diffusion rate of the dye. The agitation reduces the violence of boiling, so that higher temperatures (close to boiling) may be used safely. This also increases the diffusion rate of the dye. The thermostat controls the temperature of the heat transfer medium, which may be set at any temperature from 23° C. to 130° C. The combination of side heating, agitation, and thermostatic temperature control result in an improved system for coloring plastic lenses.

What is claimed is:

1. A device for coloring lenses and filters comprising:
   an electrically heated transfer fluid which in turn heats only the sides of the tinting tank since the bottom of the tank rests on the bottom of the heat transfer fluid's tank;
   a spill containment system consisting of beveled containment reservoir holes mating with an o-ring on each overly tall tinting tank to prevent contamination of the heat transfer by any boiled-over dye;

rotation of the multiple lens or filter holder within the tinting tank by placing it on a rotating platform which is magnetically or mechanically coupled to the spinning motor or other rotation providing device;

precise thermostatic temperature control of the heat transfer fluid.

* * * * *